(12) United States Patent
Miller et al.

(10) Patent No.: US 7,256,793 B2
(45) Date of Patent: Aug. 14, 2007

(54) SYSTEM AND METHOD FOR COLOR MANAGEMENT OF MULTIPLE COLOR DEVICES AND COLOR SPACES

(75) Inventors: Russell Miller, Stittsville (CA); Yahya Hasanain, Kanata (CA); Rick Fortin, Ottawa (CA); Volodymyr Kyrnychnyy, Nepean (CA); Stephen Joseph Sammon, Ottawa (CA); Daniel E. Franzblau, Gloucester (CA)

(73) Assignee: Corel Corporation (CA)

( * ) Notice: Subject to any disclaimer, the term of this patent is extended or adjusted under 35 U.S.C. 154(b) by 240 days.

(21) Appl. No.: 09/965,237

(22) Filed: Sep. 27, 2001

(65) Prior Publication Data
US 2003/0016230 A1    Jan. 23, 2003

(30) Foreign Application Priority Data
Jul. 20, 2001   (CA) .................................. 2353390

(51) Int. Cl.
*G09G 5/02* (2006.01)
(52) U.S. Cl. ............... 345/591; 345/593; 345/594; 345/589; 345/604
(58) Field of Classification Search ........... 345/589, 345/594, 591, 593, 604
See application file for complete search history.

(56) References Cited
U.S. PATENT DOCUMENTS

| | | | |
|---|---|---|---|
| 5,627,950 A | 5/1997 | Stokes | 395/131 |
| 5,806,081 A * | 9/1998 | Swen et al. | 715/528 |
| 5,809,164 A | 9/1998 | Hultgren, III | 382/162 |
| 5,867,169 A | 2/1999 | Prater | 345/431 |
| 5,909,220 A | 6/1999 | Sandow | 345/431 |
| 5,982,379 A | 11/1999 | Suzuki et al. | 345/431 |
| 6,058,208 A | 5/2000 | Ikeda et al. | 382/167 |
| 6,081,254 A | 6/2000 | Tanaka et al. | 345/154 |
| 6,157,735 A | 12/2000 | Holub | 382/167 |
| 6,381,036 B1 * | 4/2002 | Olson | 358/1.9 |
| 6,741,262 B1 * | 5/2004 | Munson et al. | 345/594 |
| 2002/0180751 A1 * | 12/2002 | Rozzi | 345/589 |

FOREIGN PATENT DOCUMENTS

WO   WO95/31794   11/1995

* cited by examiner

Primary Examiner—Kee M. Tung
Assistant Examiner—Tam Tran
(74) Attorney, Agent, or Firm—Hayes Soloway P.C.

(57) ABSTRACT

A color management user interface controller is provided for use in a color management system for assisting users to manage color settings of multiple colour entities, such as color devices and color spaces. The user interface controller has a representation controller and a relation indicator controller. The representation controller presents representation of each color entity. The relation indicator controller presents one or more relation indicators indicating color relation between the color entities represented by the representations.

28 Claims, 10 Drawing Sheets

SYSTEM AND METHOD FOR COLOR MANAGEMENT OF MULTIPLE COLOR DEVICES AND COLOR SPACES

This invention relates to a system and method for colour management of multiple devices and/or colour spaces, and more particularly, to a system and method for managing colour transformations of images transferred between various devices and/or colour spaces.

BACKGROUND OF THE INVENTION

Desktop graphics applications allow colour images to be reproduced on various devices. Colours may be also converted from a colour space to another colour space, e.g., from a RGB space to a CMYK space. Each device or colour space has a specific colour characteristics it can reproduce. For example, a monitor displays a same colour differently from a printing press. Different colour characteristics can occur even between similar models of equipment from the same manufacturer. For colours to be accurately translated from device to device or from colour space to colour space, users need to account for the differences between the colour characteristics of each device or colour space.

In order to assist adjustment of colours between different devices and colour spaces, conventionally colour profiles are used to describe colour characteristics of colour devices and colour spaces. Manufacturers of devices often provide ICC colour profiles with their devices. ICC Colour Profiles are colour profile files in a format defined by the International Colour Consortium (ICC).

Typically, modern desktop graphics applications provide users with the means to manage colour characteristics of images that are obtained, displayed or printed on various devices, or converted to different colour spaces. However, generally there are many devices and colour spaces whose colour settings need to be adjusted. The number of these devices and colour spaces in combination with the range of possible settings for each of them can make tasks of accurate colour management difficult, especially for novice users.

Existing systems usually have a user interface for allowing users to manage colours. However, components of this type of user interface spread among different parts of the graphic application. For example, a user interface of colour management for printing on a specified printer is provided in the setting user interface for the specified printer. Such spread user interface prevents users from clearly seeing how these devices and colour spaces are related to each other. An image reproducing job often involves a group of colour devices and spaces. It is difficult for users to organize colour management settings in groups specific to the type of job to be performed.

It is therefore desirable to provide a user interface that allows users to easily manage colours of multiple colour devices and colour spaces.

SUMMARY OF THE INVENTION

It is an object of the invention to provide a novel system and method for colour management of multiple colour devices and colour spaces that obviates or mitigates at least one of the disadvantages of existing systems.

The invention uses a user interface which presents representation of relevant colour devices and colour spaces, and colour relation indicators indicating colour setting relation between the colour devices and spaces.

In accordance with an aspect of the present invention, there is provided a colour management user interface controller for use in a colour management system for assisting users to manage colour settings of multiple colour entities. The user interface controller comprises a representation controller for presenting representation of each colour entity; and a relation indicator controller for presenting one or more relation indicators indicating colour relation between the colour entities represented by the representations.

In accordance with another aspect of the present invention, there is provided a method for assisting colour management of multiple colour entities. The method comprises steps of presenting representation of each colour entity; and presenting one or more relation indicators indicating colour relation between the colour entities represented by the representations.

In accordance with another aspects of the present invention, there are also provided a computer readable memory element storing the instructions or statements and electronic signals for use in the execution in a computer of the method for assisting colour management of multiple colour entities.

In accordance with another aspect of the present invention, there is provided code for use in a colour management system for assisting colour management of multiple colour entities. The code comprises code for presenting representation of each colour entity; and code for presenting one or more relation indicators indicating colour relation between the colour entities represented by the representations.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
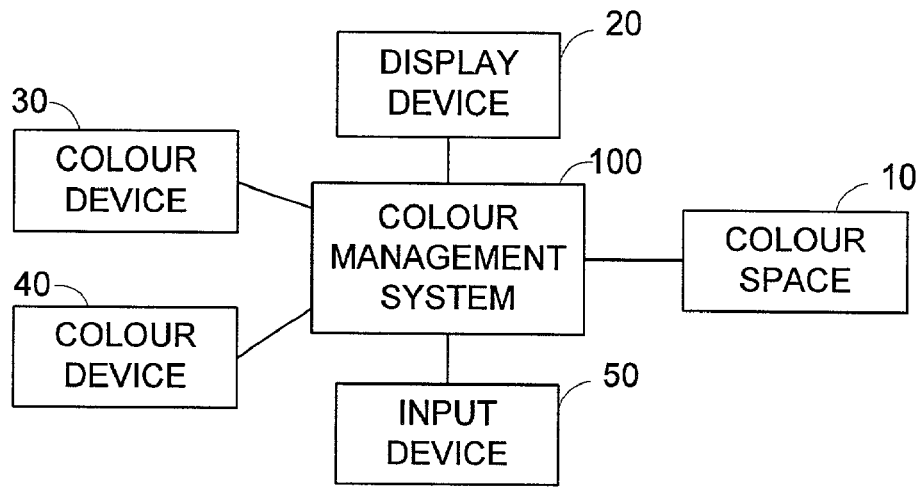
FIG. 1 is a block diagram showing an example of a computer system in which an embodiment of the present invention is applied.

FIG. 1 shows an example of a computer system that uses a colour management system 100 in accordance with an embodiment of the present invention. The colour management system 100 provides a graphical user interface for managing colour transformations of images transferred between various devices and colour spaces. In this example, the colour management system 100 is used for managing colour transformations between colour space 10, display device 20 and other colour devices 30, 40. Colour space 10 may be internal or external colour space of the colour management system. Colour devices and colour spaces may be correctively called as "colour entities" hereinafter. The colour management system 100 also receives user input through an input device 50, such as a mouse, keyboard or touch panel.

Figure 2:
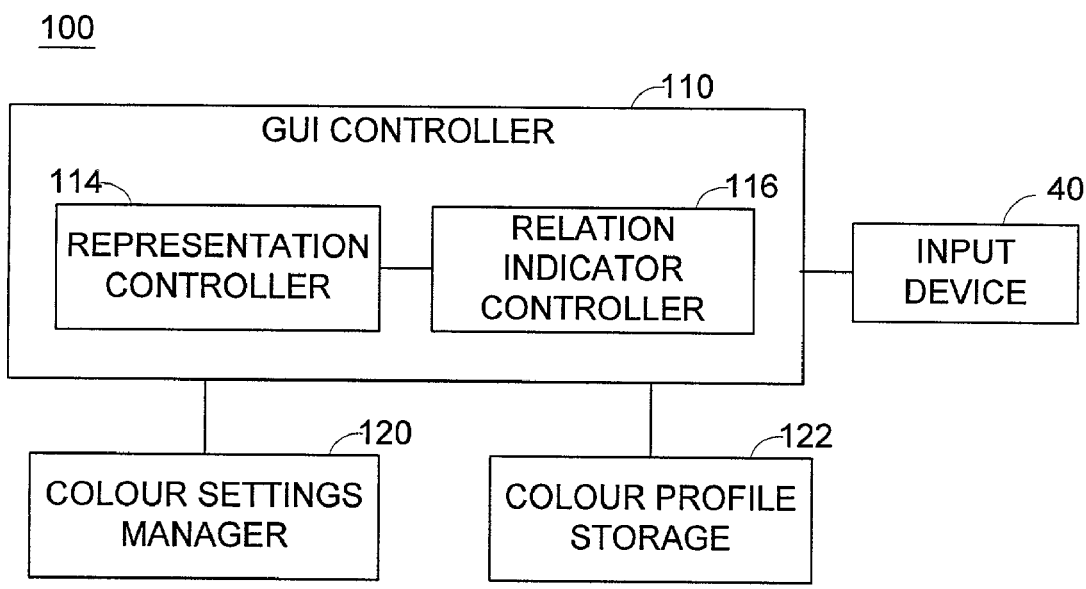
FIG. 2 is a block diagram showing an embodiment of a colour management system in accordance with an embodiment of the present invention.

As shown in FIG. 2, the colour management system 100 may comprise a Graphic User Interface (GUI) controller 110 and a colour settings manager 120. The colour settings manager 120 controls colour settings of the colour entities, e.g., colour spaces 10 and colour devices 20–40. A single colour settings manager 120 may control multiple colour entities, or a separate colour settings manager 120 may be provided for each colour entity or a group of colour entities. The colour setting data, or colour profile, of each colour entity may be stored in a profile storage 122.

The GUI controller 110 has a colour entity representation controller 114 and a colour relation indicator controller 116. The representation controller 114 controls display of representation of each colour entity that is under control of the colour management system 100. The indicator controller 116 controls display of indicators indicating colour setting relation between the colour entities.

Figure 3:
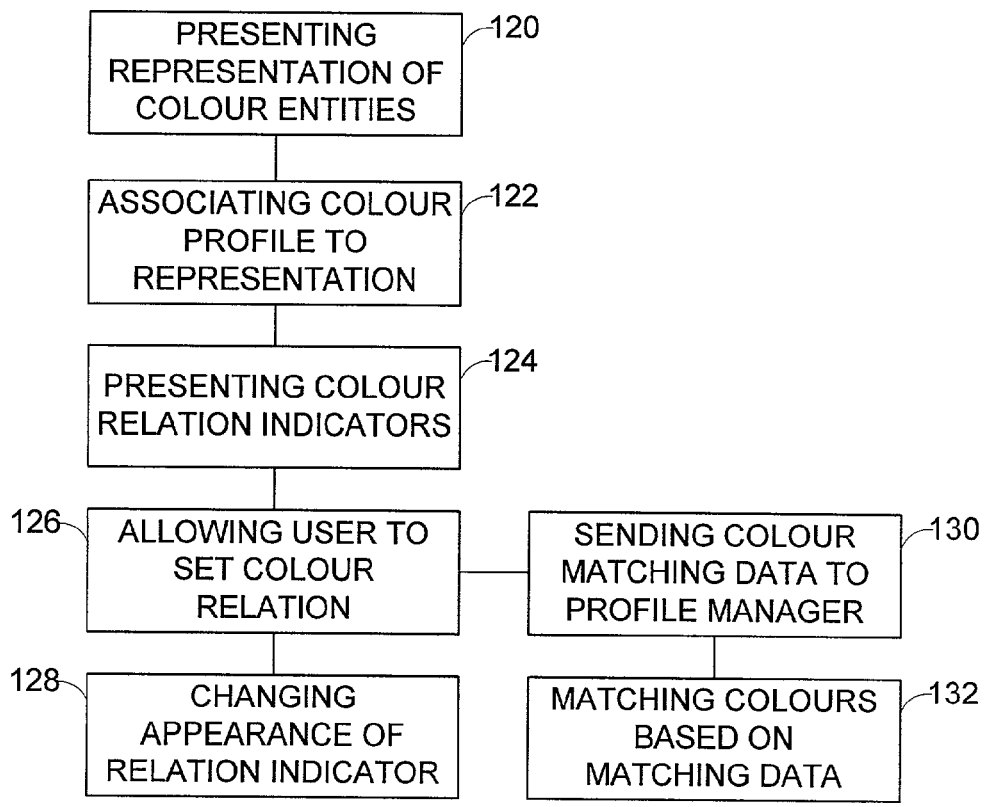
FIG. 3 is a flowchart showing an embodiment of a method of colour management.
Figure 4:
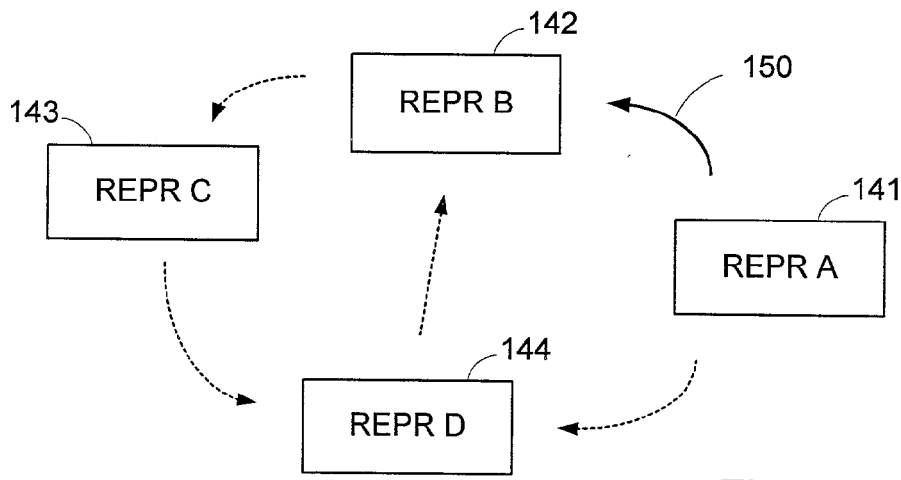
FIG. 4 is a diagram showing a user interface in accordance with an embodiment of the present invention.

FIG. 3 shows a method of managing colours in accordance with an embodiment of the present invention. FIG. 4 shows an example of a user interface displayed by the method.

The presentation controller 114 displays representation 141–144 of each colour entity 10–40 (120). The representation may take any suitable form, such as a label, a graphical symbol or an icon, or a combination thereof. When the system allows fine tuning of colour settings, it is preferable that each representation 141–144 is associated with a colour profile of the corresponding colour entity 10–40 (122), as further described below. The colour profile of each colour entity may be obtained from the colour profile storage 122.

The relation indicator controller 116 presents relation indicators 150 indicating available colour setting relation between the colour entities represented by the representation 141–144 (124). The relation indicators may also take any suitable form, such as arrow 150 as shown in FIG. 4, colour graduations or changes in the appearance of the representation 140 themselves. The relation indicators may be buttons so that users can select a desired indicator by clicking on the button using the input device 50.

The system 100 allows the user to set colour relation between the colour entities using the relation indicators 150 (126). The setting of the colour relation may be carried out by selecting one or more desired indicators 150. The relation indicator controller 115 changes the appearance of the selected indicators 150 in accordance with the user's selection (128). For example, when the user intends to simulate the colours of colour entity B with those of colour entity A, then the user selects the allow 150 from representation A 141 to representation B 142. The arrow 150 is displayed in solid line, while the other arrows are displayed in broken lines.

In accordance with the user's selection, the relation indicator controller 116 may generate and send colour matching data to the colour settings manager 120 (130). The colour matching data indicates that the setting of which colour entity should be matched to those of which colour entity. In the example shown in FIG. 4, the settings of colour entity B is matched to those of colour entity A. The colour settings manager 120 may receive the colour matching data from the input device 40, rather than from the relation indicator controller 116.

The colour settings manager 120 matches the colour profile of the corresponding colour entity based on the colour matching data (132). The actual colour matching may be carried out using any known suitable colour profile managing system, such as, Kodak Colour Management System or Microsoft ICM System.

Thus, the colour management system 100 eliminates needs of adjusting the colour settings of each device or colour space individually, and simplifies and enhances colour management process.

When presenting representation of colour entities and colour relation indicators, it is preferable that all relevant user interface components are gathered into one dialogue box for ease of colour management of all relevant colour entities. "All relevant colour entities" may include all entities under control of the colour management system 100 or may include a group of entities related to one or more specific tasks or jobs.

When the representation of a colour entity is associating with its corresponding colour profile, the users may tune or adjust colour settings of the entity from the same colour management user interface. In that case, the colour management settings may be split into multiple levels. The first or standard level is used for managing the standard settings. The colour management user interface may expose it to the user on a main dialogue box. The subsequent advanced level or levels allow users to manage details of colour settings. The advanced levels may be a series of child dialogue boxes. The child dialogue boxes may be viewed by selecting a dialogue button associated with representation of colour entities in the main dialogue box. The representation themselves may be an icon button to allow users to view the child dialogue boxes.

Colour management settings may be grouped into colour management styles. The colour management styles may be selected, and created, by the user to reflect specifics of the job being performed.

Figure 5:
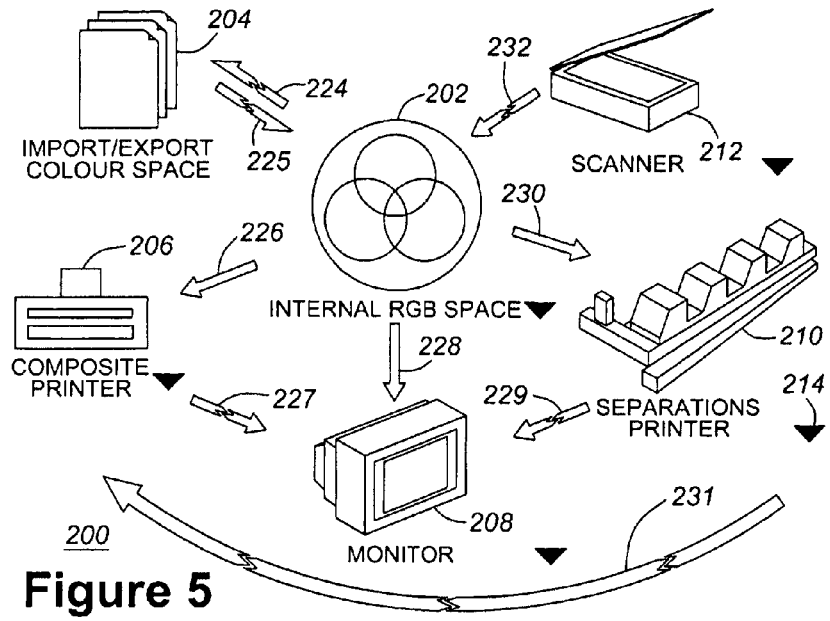
FIG. 5 is a diagram showing a user interface in accordance with another embodiment of the present invention.

FIG. 5 shows an embodiment of a colour management dialogue box 200 presented to users. This dialogue box 200 exemplifies the settings corresponding to a graphics job targeted to a professional print press with desktop printer proofing.

The colour management dialogue 200 presents colour entities to the user in the form of icons. Colour entities include multiple colour spaces and devices, namely, two colour spaces: internal RGB colour space 202 and import and export colour space 204; and four colour devices: CMYK composite printer 206, monitor 208, offset separations printer 210, and scanner and digital camera 212. Each of the colour entities has a colour profile associated therewith. The colour profiles are selected from a list of profiles installed on the computer system. Triangle buttons 214 shown next to the labels of the icons indicates that these buttons may be selected to access the details of the associated colour profile for fine tuning.

Arrow buttons 224–232 are provided between the icons 202–212. The arrows represents how the colour profiles of the devices and colour spaces are used. The arrow buttons 224–232 allow the user to easily change colour settings for the devices and colour spaces 202–212. At the same time they visually represent flow of colour settings data between the colour devices and space 202–212. When the user clicks on the arrow buttons 224–232, they switch their states from ON to OFF or vice versa. When an arrow button is ON, it is shown in a dark solid line; and when it is OFF, it is shown in a light broken line. For example, if an arrow pointing from/to the internal RGB colour space 202 to a device is in ON state, then the colour profile of the device is used for colour correction of images received from or reproduced on the device. If it is OFF, the profile of the device is ignored.

The icons 202–212 and arrow buttons 224–232 are presented and arranged to the user in a clear and intuitive way. This user interface 200 helps the users to set colour management system properly and utilize the power of colour management capabilities provided in the computer system. It also visually demonstrates the state of the system and relation between the devices and colour spaces.

FIGS. 5–10 illustrate different combinations of the state of arrow buttons. In FIG. 5, when the arrow button 232 from the scanner 212 to the internal RGB space 202 is ON, the scanner profile is used for colour correction of images scanned by scanner 212. When it is OFF, then the scanner profile is not used.

When the arrow button 228 from the internal RGB space 202 to the monitor 208 is ON, colours are calibrated for display on the monitor 208 using monitor's colour profile. In this case, the arrow buttons 227 and 229 from the composite printer 206 and separations printer 210 are OFF. Accordingly, simulation of the printer colours on the monitor 208 is off.

When the arrow button 228 from the internal RGB space 202 to the monitor 208 is OFF, the monitor's profile is not used for displaying images on monitor 208. Colours are displayed uncorrected if none of the arrows 227–229 that go to the monitor 208 are off. If any of the arrows 227, 229 that go from the composite printer 206 or separations printer 210 is ON, the monitor 208 displays colours simulated for printer output.

Figure 6:
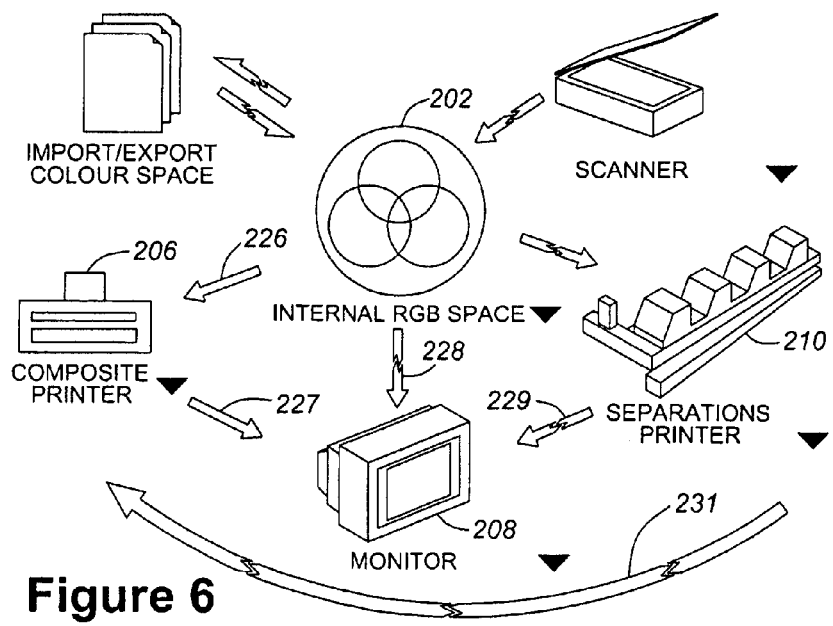
FIG. 6 is a diagram showing the user interface shown in FIG. 5 in a different state.

In FIG. 6, when arrow button 226 from internal RGB space 202 to the composite printer 206 is ON, the printer's profile is used for colour correction of images reproduced on the composite printer 206 when printing composite only. When the arrow button 226 is OFF, the profile of composite printer 206 is not used and the composite printing colours are not corrected at all.

When arrow button 227 from the composite printer 206 to the monitor 208 is ON, colour output of the composite printer 206 is simulated on the monitor 208. In that case, arrow button 229 from the separations printer 210 to the monitor 208 is OFF. The arrow button 228 from the internal RGB space 202 to the monitor 208 is OFF. If arrow button 231 from the separations printer 210 to composite printer 206 is OFF, then arrow button 226 from the internal RGB space 202 to the composite printer 206 is ON. If arrow 231 from the separations printer 210 to composite printer 206 is ON, then arrow button 226 from the internal RGB space 202 to the composite printer 206 is OFF and arrow button from the internal RGB space 202 to the separations printer 210 is ON.

When arrow button 227 from the composite printer 206 to the monitor 208 is OFF, the output of the composite printer 206 is not simulated on the monitor 208.

Figure 7:
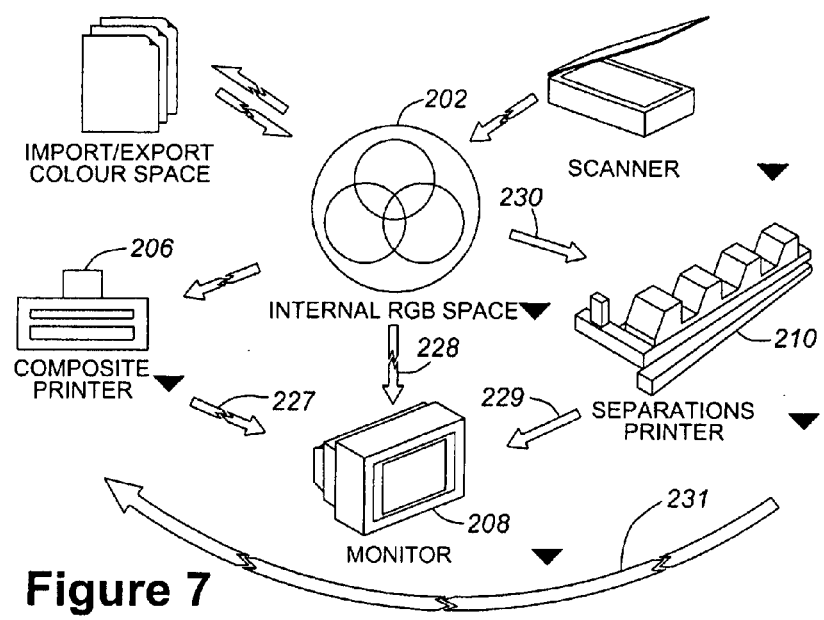
FIG. 7 is a diagram showing the user interface shown in FIG. 5 in a different state.

In FIG. 7, arrow button 230 from the internal RGB space 202 to the separations printer 210 is ON, the colour profile of the separations printer 210 is used for colour correction when printing separations only. When it is OFF, the profile is not used for separation printing.

When arrow button 229 from the separations printer 210 to the monitor 208 is ON, the output of the separations printer 210 is simulated on the monitor 208. In that case, arrow button 230 from the internal RGB space 202 to the separations printer 210 is ON. Arrow button 227 from the composite printer 206 to the monitor 208 is OFF. Also, arrow button 228 from the internal RGB space 202 to the monitor 208 is OFF.

When arrow button 229 from the separations printer 210 to the monitor 208 is OFF, the output of the separations printer 210 is not simulated on the monitor 208.

Figure 8:
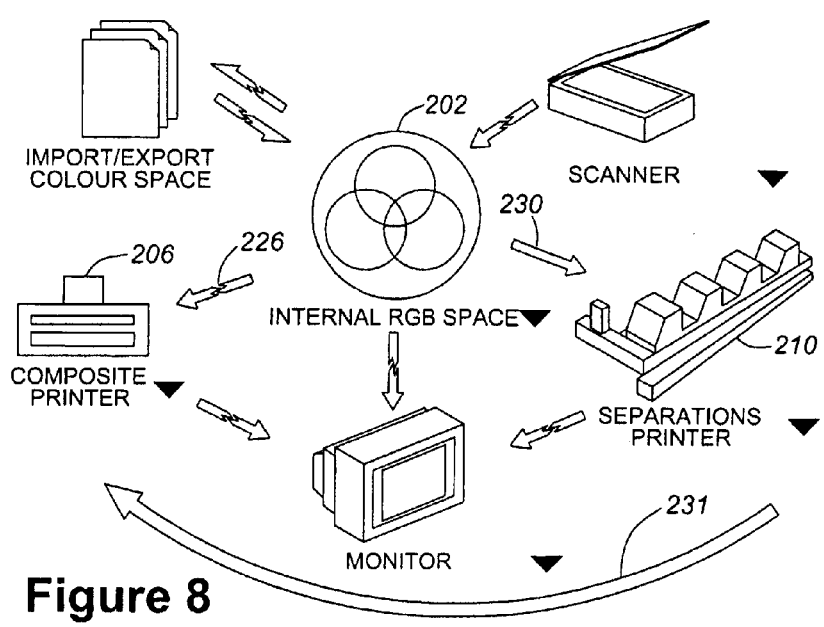
FIG. 8 is a diagram showing the user interface shown in FIG. 5 in a different state.

In FIG. 8, when arrow button 231 from the separations printer 210 to composite printer 206 is ON, the output of the separations printer 210 is simulated on the composite printer 206. In that case, arrow button 230 from the internal RGB space 202 to the separations printer 210 is ON. Also, arrow button 226 from the internal RGB space 202 to the composite printer 206 is OFF.

Figure 9:
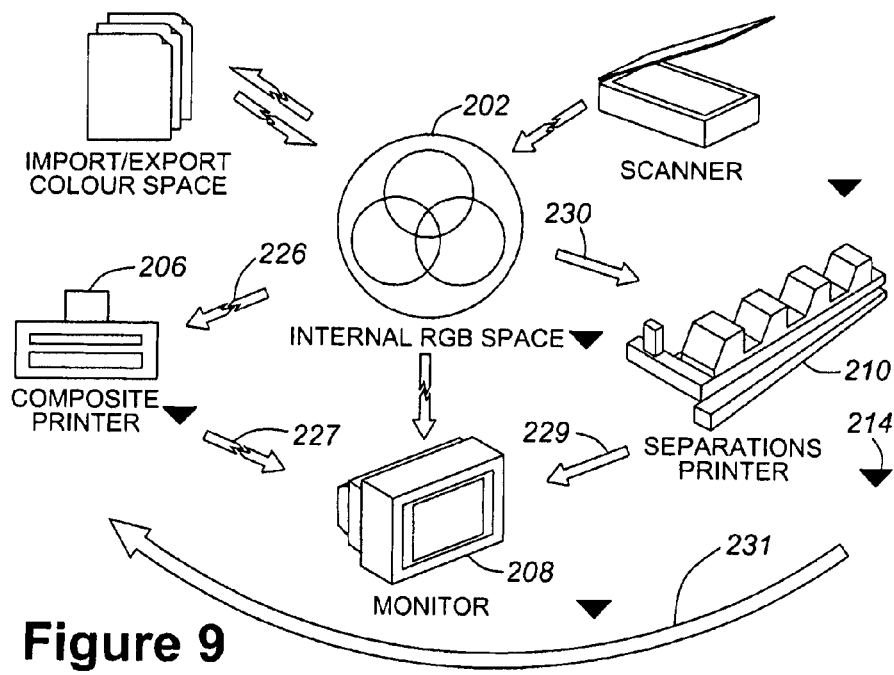
FIG. 9 is a diagram showing the user interface shown in FIG. 5 in a different state.
Figure 10:
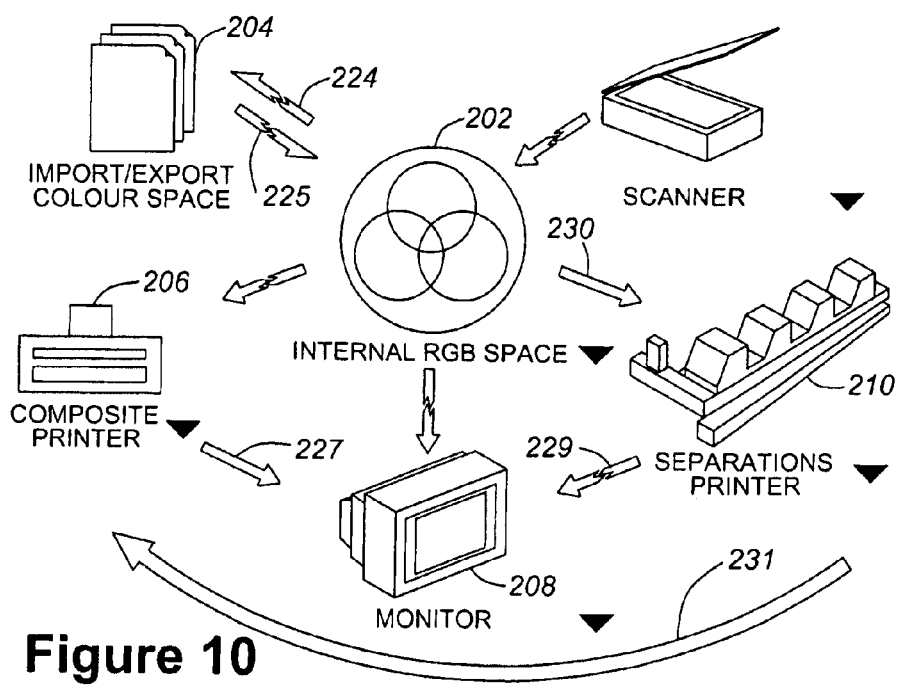
FIG. 10 is a diagram showing the user interface shown in FIG. 5 in a different state.

As shown in FIGS. 9 and 10, one of arrow button 229 from the separations printer 210 to the monitor 208 and arrow button 227 from the composite printer 206 to the monitor 208 may be ON, but not both may be ON at the same time.

When arrow button 231 from the separations printer 210 to composite printer 206 is OFF, the output of the separations printer 210 is not simulated on the composite printer 206.

Figure 11:
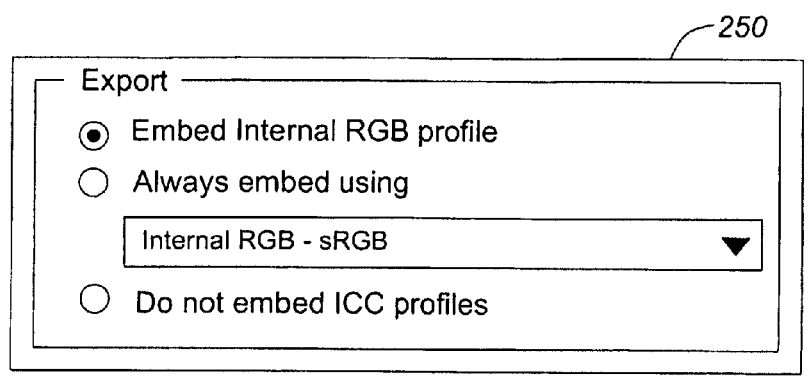
FIG. 11 is a diagram showing an example of a child setting dialogue of the user interface shown in FIG. 5.
Figure 12:
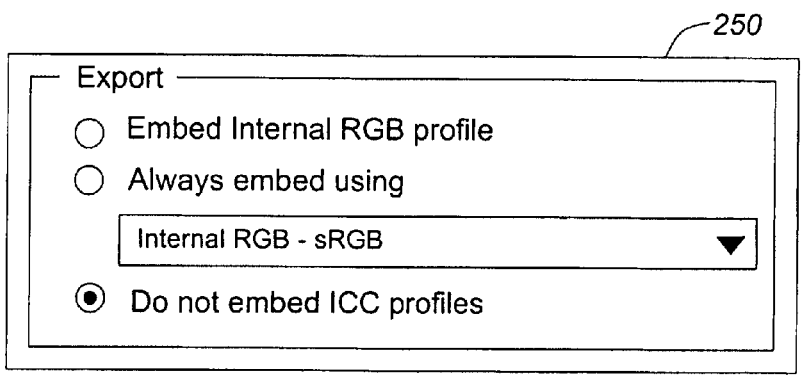
FIG. 12 is a diagram showing the child setting dialogue in a different state.

FIGS. 11 and 12 show examples of an advanced profile settings dialogue box 250 for export colour settings. When arrow button 225 form the internal RGB space 202 to the export colour space 204 is ON, the advanced profile settings in the dialogue 250 are as shown in FIG. 11, i.e. the profile of the internal RGB 202 is embedded in the exported images. If it is OFF, the settings are as shown in FIG. 12, i.e., no ICC profiles are embedded.

Figure 13:
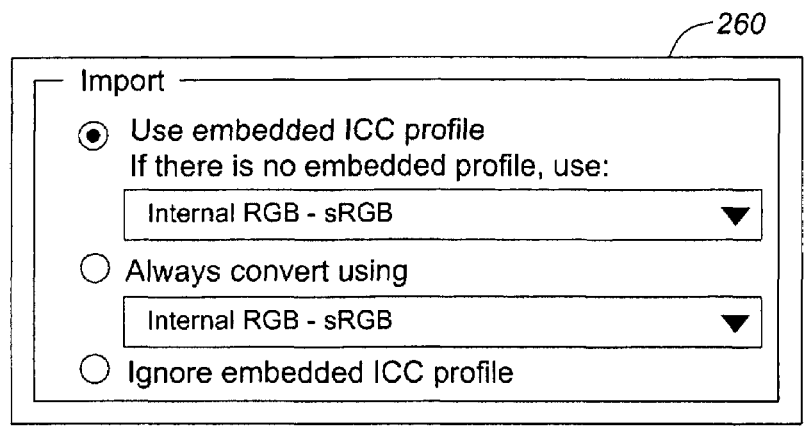
FIG. 13 is a diagram showing another example of a child setting dialogue of the user interface shown in FIG. 5.
Figure 14:
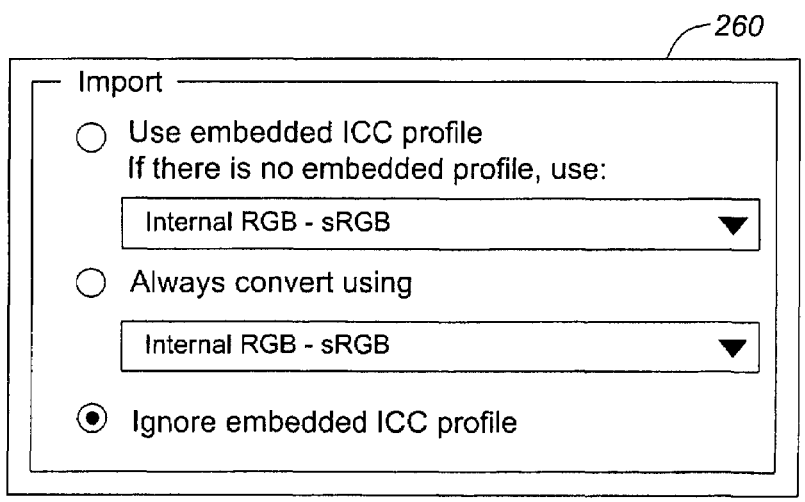
FIG. 14 is a diagram showing the child setting dialogue in a different state.

FIGS. 13 and 14 show examples of an advanced profile settings dialogue box 260 for import colour settings. When arrow button 224 from the export colour space 204 to the internal RGB space 202 is ON, the advanced profile settings in the dialogue 260 are as shown in FIG. 13, i.e. an ICC profile embedded in the imported images is used. If it is OFF, the settings are as shown in FIG. 14, i.e., the embedded ICC profile is ignored.

In addition to these examples, the colour management dialogue 200 may provide the user with a set of predefined settings targeted for a specific type of job, such as desktop printing, professional output, and Web output. These settings may be provided as styles for easy selection by the users.

Figure 15:
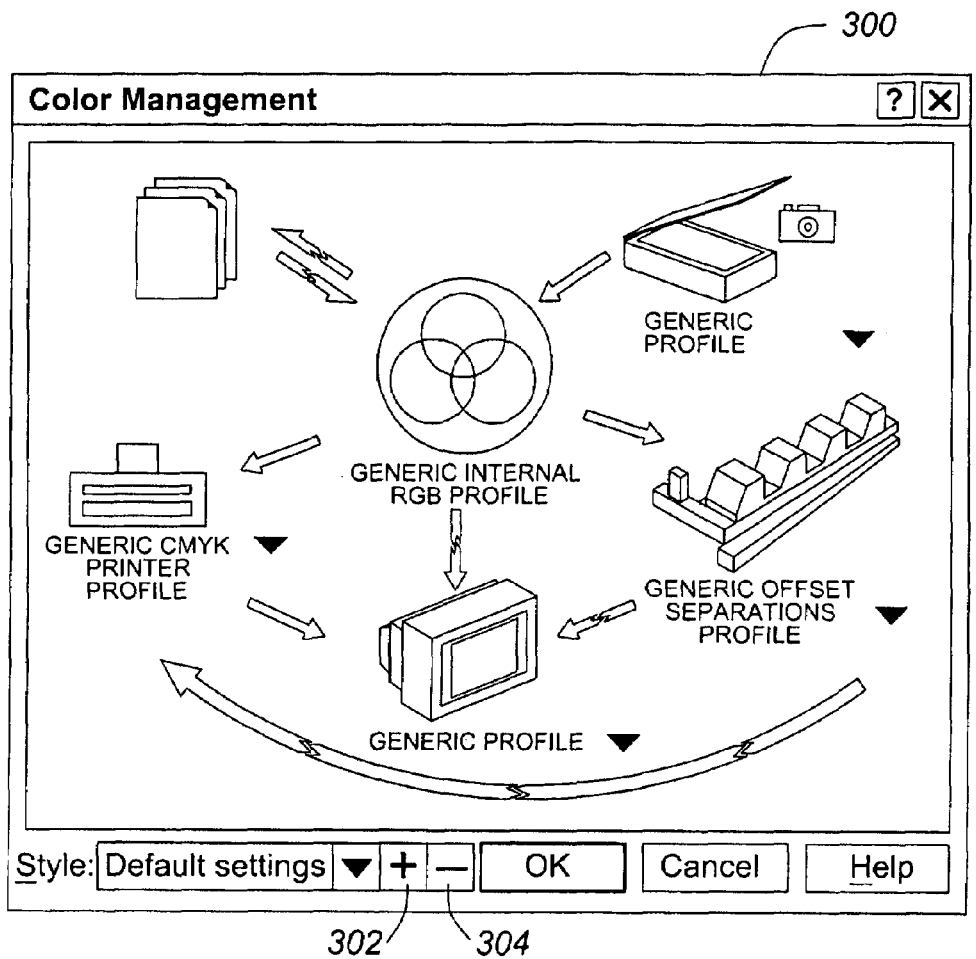
FIG. 15 is a diagram showing an example of the entire colour management dialogue.
Figure 16:
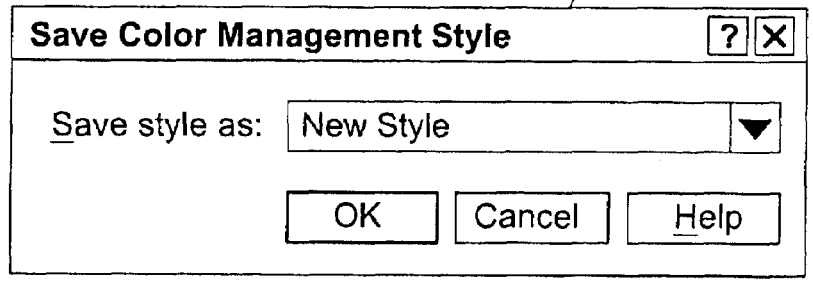
FIG. 16 is a diagram showing an example of a dialogue for saving a colour management style.

Also, the users may create their own styles. FIG. 15 shows an example of the entire colour management dialogue 300. In this example, the dialogue provides a "+" button 302 to add a new style. After the user selects desired arrows 306 to set the desired state, the user clicks the "+" button 302. This brings up a save colour management style dialogue 310, as shown in FIG. 16. The user can type the name of the style and save it. Also, the user may click on a "−" button 304 shown in FIG. 15 to delete a style.

The colour management dialogue 200 has a number of child dialogues that can be invoked by clicking on the device/colour space icons 202–212 or triangle buttons 214 that allow for selection of advanced options to fine tune colour management.

Figure 17:
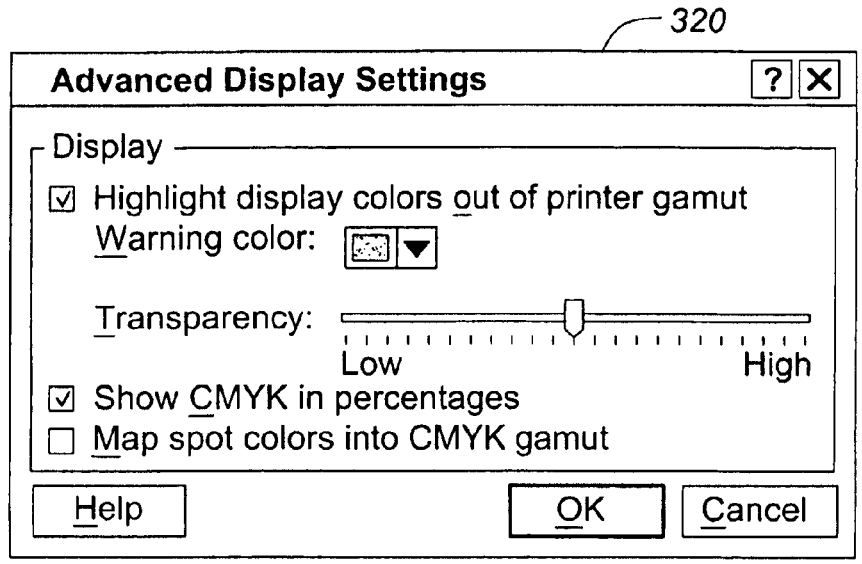
FIG. 17 is a diagram showing an example of an advanced display settings dialogue.
Figure 18:
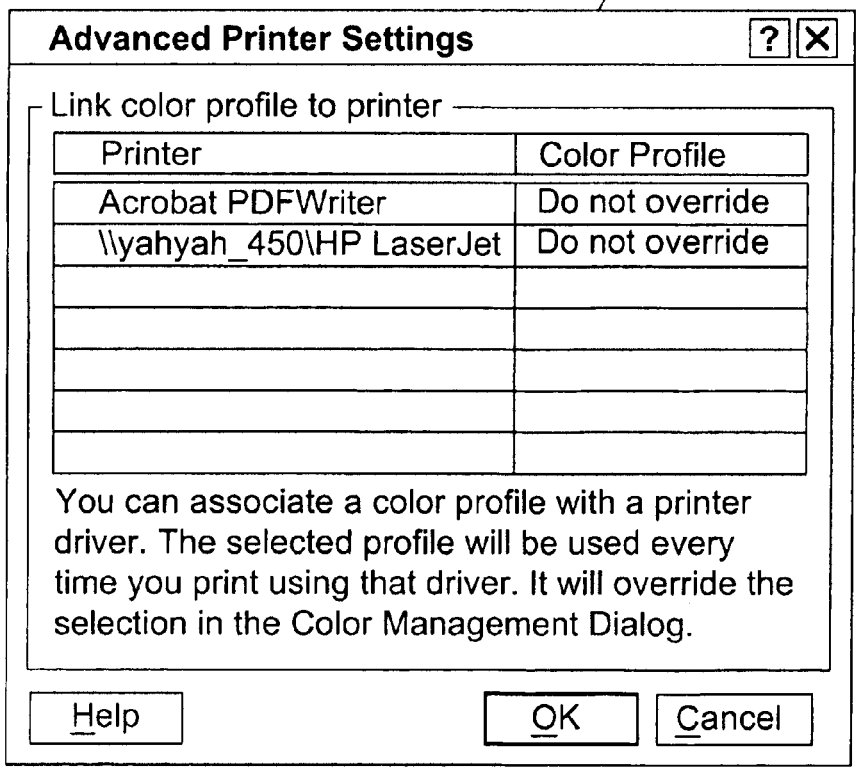
FIG. 18 is a diagram showing an example of an advanced print settings dialogue.
Figure 19:
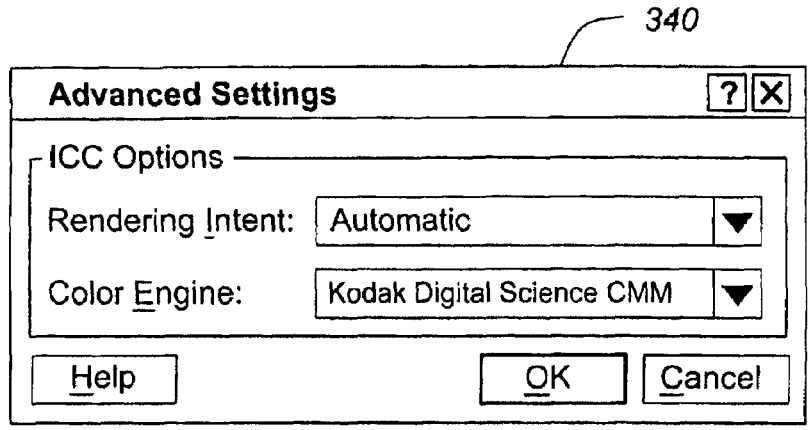
FIG. 19 is a diagram showing an example of an advanced settings for setting ICC options.
Figure 20:
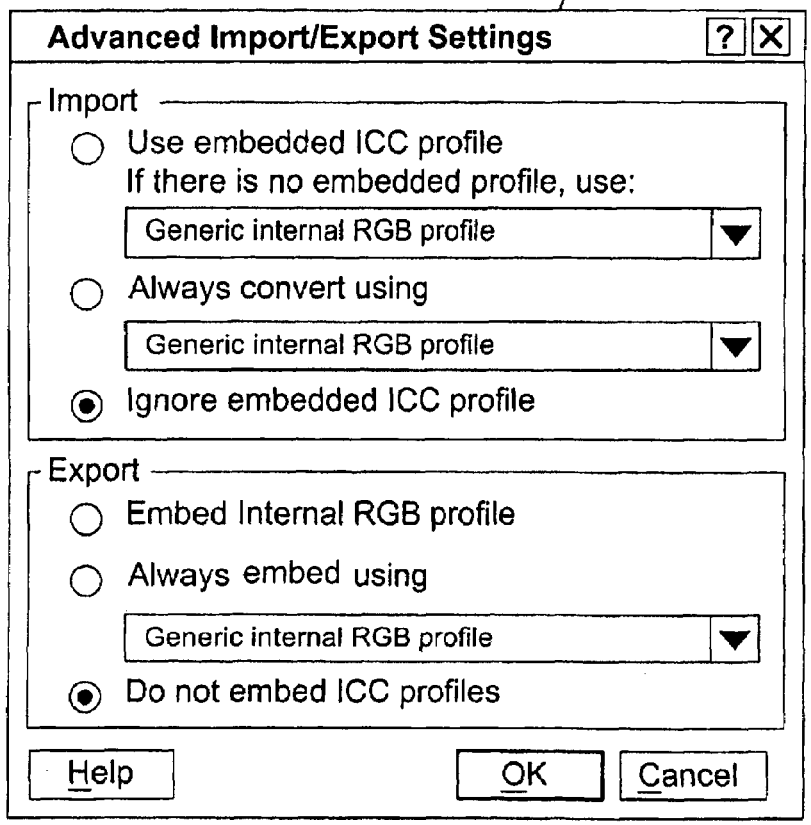
FIG. 20 is a diagram showing another example of an advanced import/export settings dialogue.

FIGS. 17–20 show examples of such child dialogues. FIG. 17 shows an advanced display settings dialogue 320 for setting the display on monitor 208. FIG. 18 shows an advanced print settings dialogue 330 for setting printers 206, 210. FIG. 19 shows an advanced settings 340 for setting ICC options. FIG. 20 shows another example of an advanced import/export settings dialogue 350 for setting import and export options.

The embodiment shown in FIGS. 5–10 is an example of positioning the icons representing the devices and colour spaces in places where users may see that the interaction between them is logical and simple to understand. However, other arrangements of icons and arrow buttons may be possible for achieving similar effects.

The colour management method of the present invention may be implemented by software. The software code may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention. For example, the components of the colour management system are shown as separate components, but one or more components may be combined or provided as a part of other components of the computer system.

What is claimed is:

1. A colour management user interface controller for use in a colour management system for assisting users to manage colour settings of multiple colour entities, the user interface controller comprising:
   a representation controller for presenting to a user representations, each representing each of the multiple colour entities; and
   a relation indicator controller for presenting to the user one or more relation indicators indicating colour relation between the multiple colour entities represented by the representations so as to assist the user to manage colour settings of the multiple colour entities,
   wherein the relation indicator controller presents the relation indicators as arrow buttons, each arrow button representing a direction of use of colour settings of a corresponding colour entity.

2. The user interface controller as claimed in claim 1, wherein the relation indicator controller has a function to allow the user to select a relation indicator to manage the colour relation between colour entities that correspond to the relation indicator.

3. The user interface controller as claimed in claim 2, wherein the relation indicator controller has a function to change the appearance of a relation indicator when the relation indicator is selected by the user.

4. The user interface controller as claimed in claim 2, wherein the relation indicator controller presents colour relation indicators which are available for user's selection.

5. The user interface controller as claimed in claim 2, wherein the relation indicator controller has a function to generate, in accordance with the relation indicator selected by the user, colour matching data indicating a colour entity whose colour settings is used for colour matching.

6. The user interface controller as claimed in claim 1, wherein the representation controller has a function to associate each representation of each of the multiple colour entities with a colour profile of the colour entity.

7. The user interface controller as claimed in claim 6, wherein the colour management system has a colour profile storage storing colour profiles of the multiple colour entities, and the representation controller has a function to obtain the colour profile of each of the multiple colour entities from the colour profile storage.

8. The user interface controller as claimed in claim 6, wherein the representation controller has a function to present to the user the colour profile of the multiple colour entities.

9. The user interface controller as claimed in claim 8, wherein the representation controller presents to the user a representation of a colour entity in multiple levels such that standard settings are presented in a main level and detailed settings are presented in a secondary level.

10. A colour management system for assisting users to manage colour settings of multiple colour entities, the colour management system comprising:
    a user interface controller for presenting to a user colour relation between the multiple colour entities in accordance with colour relation setting input by the user, the user interface controller comprising:
      a representation controller for presenting to the user representations, each representing each of the multiple colour entities; and
      a relation indicator controller for presenting to the user one or more relation indicators indicating the colour relation between the multiple colour entities represented by the representations,
      wherein the relation indicator controller presents the relation indicators as arrow buttons, each arrow button representing a direction of use of colour settings of a corresponding colour entity; and
    a colour settings manager for controlling colour settings of the multiple colour entities in accordance with the colour relation setting input by the user so as to assist the user to manage colour settings of the multiple colour entities.

11. A method for assisting colour management of multiple colour entities, the method comprising the steps of:
    presenting to the user representations, each representing each of the multiple colour entities; and
    presenting to the user one or more relation indicators indicating colour relation between the multiple colour entities represented by the representations so as to assist the user to manage colour settings of the multiple colour entities, wherein the step of presenting one or more relation indicators comprises the step of presenting to the user the relation indicators as arrow buttons to represent directions of use of colour settings of the multiple colour entities.

12. The method as claimed in claim 11 further comprising a step of:
receiving user input to select a relation indicator to manage the colour relation between colour entities that correspond to the relation indicator.

13. The method as claimed in claim 12 further comprising a step of:
changing the appearance of a relation indicator when the relation indicator is selected by the user.

14. The method as claimed in claim 11, wherein the step of presenting one or more relation indicators comprises a step of presenting to the user colour relation indicators which are available for user's selection.

15. The method as claimed in claim 11, wherein the step of presenting one or more relation indicators comprises the steps of:
generating, in accordance with the relation indicator selected by the user, colour matching data indicating a colour entity whose colour settings is used for colour matching; and
sending the colour matching data to a colour settings manager for changing the colour settings for colour matching of a relevant colour entity based on the colour settings indicated in the colour matching data.

16. The method as claimed in claim 11 further comprising the steps of:
associating each representation of each of the multiple colour entities with a colour profile of the colour entity; and
presenting to the user the colour profile to allow access thereto by the user.

17. The method as claimed in claim 16, wherein the associating step comprises a step of using a colour profile storage to obtain colour profiles of the multiple colour entities.

18. The method as claimed in claim 16, wherein the step of presenting the colour profiles comprises a step of presenting to the user the colour profile as a secondary level which is accessible from a main level where standard settings are presented.

19. A computer program product for use in a colour management system for assisting colour management of multiple colour entities, the computer program product having computer program code embodied in a machine readable medium, said computer program product comprising:
a module for presenting to the user representations, each representing each of the multiple colour entities; and
a module for presenting to the user one or more relation indicators indicating colour relation between the multiple colour entities represented by the representations so as to assist the user to manage colour settings of the multiple colour entities,
wherein the module for presenting one or more relation indicators presents to the user the relation indicators as arrow buttons, each arrow button representing a direction of use of colour settings of a corresponding colour entity.

20. The computer program product as claimed in claim 19 further comprising:
a module for allowing a user to select a relation indicator to manage the colour relation between colour entities that correspond to the relation indicator.

21. The computer program product as claimed in claim 20 further comprising:
a module for changing the appearance of a relation indicator when the relation indicator is selected by the user.

22. The computer program product as claimed in claim 19 further comprising:
a module for associating each representation of each of the multiple colour entities with a colour profile of the colour entity; and
a module for presenting to the user the colour profile to allow access thereto by the user.

23. The computer program product as claimed in claim 22, wherein the module for presenting the colour profiles comprises a module for presenting the colour profile as a secondary level which is accessible from a main level where standard settings are presented.

24. A computer readable memory medium having computer readable program code storing instructions or statements for use, in the execution in a computer, of a method for assisting colour management of multiple colour entities, wherein the method comprises the steps of:
presenting to the user representations, each representing each of the multiple colour entities; and
presenting to the user one or more relation indicators indicating colour relation between the multiple colour entities represented by the representations so as to assist the user to manage colour settings of the multiple colour entities, and
wherein the step of presenting one or more relation indicators comprises the step of presenting to the user the relation indicators as arrow buttons to represent directions of use of colour settings of the multiple colour entities.

25. The computer readable memory element as claimed in claim 24, wherein the method further comprises a step of:
receiving user input to select a relation indicator to manage the colour relation between colour entities that correspond to the relation indicator.

26. The computer readable memory element as claimed in claim 25, wherein the method further comprises a step of:
changing the appearance of a relation indicator when the relation indicator is selected by the user.

27. The computer readable memory element as claimed in claim 24, wherein the method further comprises the steps of:
associating each representation of each of the multiple colour entities with a colour profile of the colour entity; and
presenting to the user the colour profile to allow access thereto by the user.

28. The computer readable memory element as claimed in claim 27, wherein the step of presenting the colour profiles comprises a step of presenting the colour profile as a secondary level which is accessible from a main level where standard settings are presented.

* * * * *